Patented Jan. 2, 1934

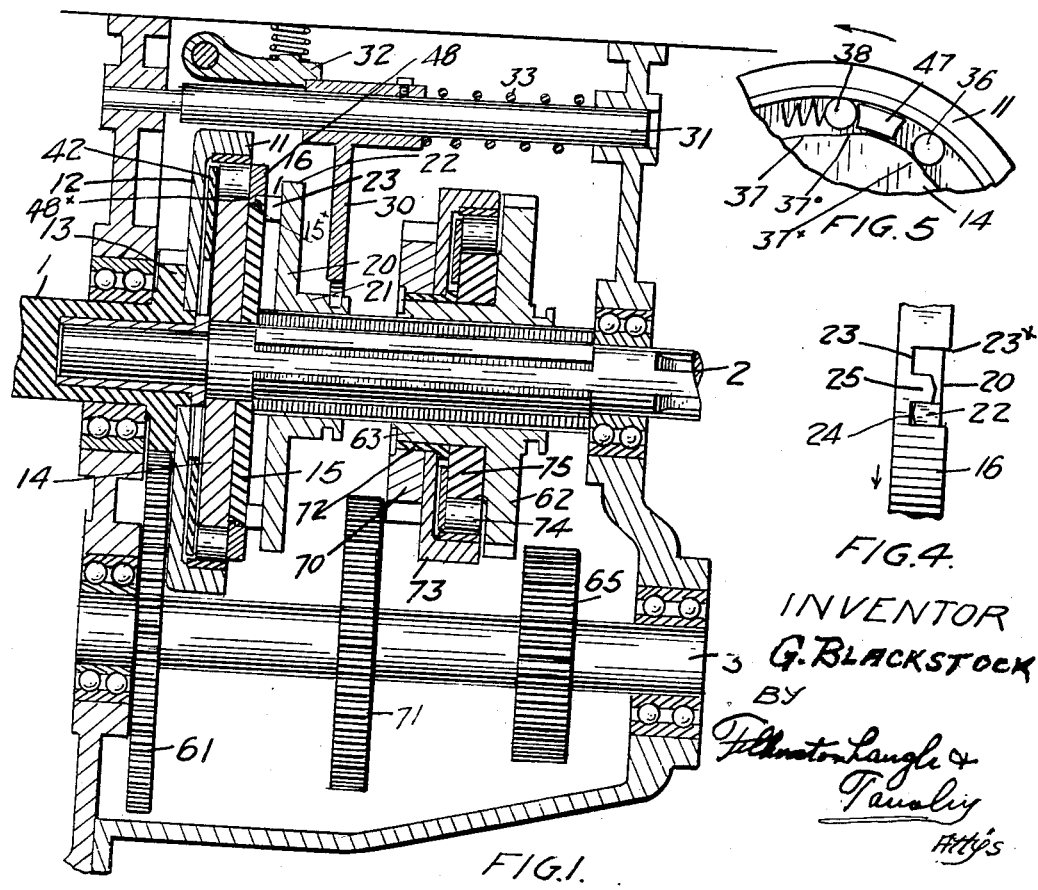

1,942,197

UNITED STATES PATENT OFFICE 1,942,197

REVERSIBLE FREEWHEEL CLUTCH TRANSMISSION

Gibbs Blackstock, Toronto, Ontario, Canada

Application July 9, 1931. Serial No. 549,747

7 Claims. (Cl. 192—44)

My invention relates to improvements in reversible free wheel clutch transmissions, and the primary object of the invention is to provide an essentially automatic free wheel clutch adapted to assume a driving condition, in which it can drive or free wheel, and a release condition in which it allows the engine or motor to advance freely but will transmit braking torque if the engine or motor is throttled.

The clutch is controlled by a floating member in a manner analogous to that disclosed in my application Serial No. 428,195, filed February 13th, 1930.

Further objects are to incorporate such a clutch in a transmission particularly one for motor vehicles, so as to give easy gear changing involving no distraction of attention by means like the pressing of a pedal, and generally as will appear below to provide for smooth and efficient working.

Incorporated in the clutch is a torque transmitting floating member having a limited arc of freedom with respect to a coacting adjacent member and connections made with the clutching parts such that when the floating member is at one end of its arc the clutch is in the driving condition and when at the other end, the release condition, the point wherein this clutch particularly differs from the previous application being that the floating member can be locked positively in either the driving or release position. It can be unlocked from the driving position to allow the advance of the driving part to carry it to the release position, from which it can be unlocked to allow the retardation of the drive shaft to carry it to the driving position.

In the preferred construction there is a drum on the drive shaft and a floating wedging member with an arc of freedom on the driven shaft and having two sets of oppositely facing wedging faces between which and the driving member are coacting rollers adapted to transmit torque in opposite directions. By means of a set of blocks or the like moving angularly with the adjacent driven member the rollers are held off one set of wedges, the drive wedges, when the floating member is in the release position, and when it is in the driving position the rollers are held off the other set, the drag wedges.

The floating member can be locked in either position, preferably by means of a sliding driven member splined on the driven shaft and having teeth to engage alternately two sets of notches or pockets, the drive and the release or drag pockets on the floating member.

If the floating member is unlocked by momentary axial motion of the sliding member when the clutch is driving the advance of the driving member carries the floating member to the release or drag position, the relative angular motion of the blocks allowing the rollers to return to the drag wedging surfaces and striking the rollers off the drive wedging surfaces. If it is unlocked when the clutch is released and the drive shaft dragging the retardation of the latter returns the floating member to the drive position, the rollers return to the drive wedging surfaces and the rollers are struck off the drag wedging surfaces.

An important factor for smooth working and long life is the fact that when the rollers are struck off there is no load on the clutch as the floating member at the time is unlocked and moving freely. There are preferably two sets of rollers, drive and drag rollers, coacting with the two sets of wedging surfaces.

In a motor car transmission the clutch forms the high gear drive and there is a free wheel device in a lower gear train and also whatever other gears of ordinary type, such as low or first and reverse, are deemed necessary, and the usual engine clutch of friction type. The last named will be referred to as the engine clutch, the terms "the clutch", the "direct drive clutch" or "roller clutch" etc. referring to this reversible free wheel clutch.

The reversible property is best made use of, not for driving a car backward for which the ordinary reversing means are preferred, but for transmitting torque in a reverse direction through the direct drive so that the engine can act as a brake if it is throttled after the clutch is released. The simplest means of giving axial motion to the sliding member to unlock the floating member is a resilient connection to the engine clutch pedal; punching this pedal when the throttle is open releases the reversible clutch and doing so when the throttle is closed sets it in the driving condition.

Fig. 1 is a section of the clutch and transmission.

Fig. 2 is a side view of the clutch alone.

Fig. 3 is a rear view of the clutch alone.

Figs. 4 and 5 show details of the clutch parts when in the driving condition.

Fig. 6 shows means of connecting the mechanism to the pedal of the engine clutch.

Fig. 7 shows a detail of a way of throwing the clutch out of action.

"Forward" and "backward" are used of rotation with and against the arrows which show the normal direction. The front is to the left of Fig. 1.

In the drawing like characters of reference indicate corresponding parts in each figure.

In Figs. 1, 2 and 3 the clutch is shown held by a latch in an inoperative position.

1 indicates the drive shaft, 2 the driven shaft. 13 is a flange, as shown in Fig. 2 or, when the clutch is incorporated in a transmission, a gear as shown in Fig. 1, and to which is secured a web 12 provided with an annular flange or drum 11 forming the driving member. 14 and 15 are portions of a floating member secured together. The portion 15 is provided with an annular concentric flange 16 extending from its rear face, the floating member being mounted on the driven shaft to rock freely but not to slide. 23$^x$ are recesses formed in the annular flange 16 and divided by a tooth 25 to form notch pockets 23 and 24.

The disc 14 forming the floating member is provided, in its periphery, with shallow recesses 37 terminating at their ends in opposing inclined wedging surfaces 37$^x$ and 37$^o$. 20 is a disc forming a sliding member having a hub 21 splined to move easily along the driven shaft. 22 are fingers extending radially from the periphery of the driven disc 20 and coacting with the pockets 23 and 24 and tooth 25 on the flange 16.

The amplitude of the angular movement of the floating member is limited by the length of the recess 23$^x$, the finger 22 fitting in the pockets 23 and 24 at the end of the movement.

30 is an actuating fork engaging a groove in the hub 21 and is secured to a sliding rod 31. The fork is now held by the latch 32 against the spring 33 so that the teeth or fingers 22 cannot enter either of the pockets 23 or 24. 36 are drive rollers coacting with the wedging surfaces 37$^x$ and 38 are the drag or catch rollers coacting with the wedging surfaces 37$^o$. 40 are weak springs inserted between the rollers 36 and 38 to press the rollers toward their respective wedging surfaces 37$^x$ and 37$^o$, such springs being retained by light flanges 41 carried on the disc 42 secured to the floating member.

48 is a ring extending freely around the periphery of the disc 15 and held thereon by a rib 48$^x$ entering a retaining groove 15$^x$ formed on the inner edge of the portion 15 of the floating member. 47 are projections forming striker blocks extending from the face of the ring 48 and overhanging the periphery of the floating member 14 between each pair of rollers 36 and 38. 49 are pins extending from the ring 48 at each side of each finger 22 and between which the finger slides and by which the ring 48 and striker blocks 47 maintain the same angular position with respect to the revolving driven shaft.

In the position shown the striker blocks 47 are holding the drive rollers 36 "off" or out of contact with the wedging faces 37$^x$ as shown in Fig. 3, while the drag rollers 38 are "on" or in contact with the wedging surfaces 37$^o$. 53 and 54 are spring fingers mounted on pins 53$^x$ and 54$^x$ carried on the ring 48, the fingers 53 and 54 alternately engage in the adjacent ends of the two adjacent recesses 23$^x$. Although the tooth 22 is not in the release pocket 23 it is held definitely opposite such pocket by the finger 53, the floating member being at one end of its arc in the released position and the spring 53 on the ring 48 being partly in the pocket 24 pulls forward on the flange 16 on the floating member holding the recess end against the opposing face of the finger 22 and, therefore, the pocket 23 opposite such finger.

The tension of the spring finger 53 pulling the floating member forward holds the wedge face 37$^x$ clear of the roller 36 which is against the block 47. The clutch is thus in the release condition but owing to the position of the latch 32 is not locked there.

Noting the way the wedging surfaces face it can be seen in Fig. 3 that on forward motion of the driving member relative to the driven member 20 and of the parts 22 and 47 etc., the rollers 38 will slip. If the driving member or drum 11 moves relatively the other way, these drag rollers 38 catch and turn the floating member backward which they can do as the tooth 22 is not in the drag or release pocket 23.

The first effect of this relative backward motion is that the striker block 47 allows the drive roller 36 to return to the wedging surface 37$^x$. The spring finger 53 leaves the pockets 24 and the similar finger 54 enters the pocket 23 and exerts a backward pull on the floating member. Then the striker block 47 strikes the drag roller 38 off the wedging surface 37$^o$ and the backward pull of the spring finger 54 (exerted on the floating member) pulls this wedge away well clear of the roller. At the same time the tooth 22 has been moving across the gap 23 in the flange 16 and is now opposite the drive pocket 24 which it cannot enter on account of the latch 32. The rollers are now as in Figure 5, and the tooth 22 as in Figure 4, except that it is opposite but not in the drive pocket 24. The floating member is in the driving position but not locked there.

Noting the way the wedges face it is seen from Figure 5 that the clutch can free wheel, that is the driving member 11 can be retarded, the drive rollers 36 slipping while the drag rollers 38 are held off by the blocks 47. The clutch cannot, however, drive because, if the drum 11 advances, the drive rollers 36 grip as the drag rollers 38 did above and turn the floating member to the release or drag position as in Figures 2 and 3. Then a series of changes, similar but opposite to those just described, takes place. The drag rollers 38 return to their wedging surfaces, the spring fingers 54 go out of action and 53 into action, pulling the floating member forward, and the drive rollers 36 are struck off. Thus as long as the latch 32 is down the clutch is inoperative, moving between the release and drive positions but not being locked or able to transmit power in either.

To render the clutch operative the latch 32 is lifted. If the floating member is at the time in the release or drag position as in Figures 2 and 3 the teeth 22 enter the pockets 23 and lock it there as the spring 33 pushes the fork 30 and sliding member 20 to the front or left. Now if the driving drum advances it moves freely as before, the rollers 38 slipping while 36 are held off. But if it is retarded the drag is transmitted through the drag rollers 38, which grip, to the wedging member 14 and from it through the teeth 25 and 22, the latter now in the pocket 23, to the driven parts 20, 21 and 2. If the driven shaft is revolving forward at the time the engine or motor will thus act as a brake when throttled or switched off, or the driven shaft can be driven backward in cases where the engine or motor is reversible. For motor vehicle use, however, it is obviously preferable to have other means for reversing.

To throw the clutch into the driving condition the floating member is unlocked while there is some backward drag on the drive shaft. The retardation of the driving member 11 now turns the floating member to the driving position as explained above and the parts are as in Figs. 4 and 5. The unlocking is effected by a momentary rightward motion of the rod 31, fork 30 and sliding member 20, 21, after which the spring 33 presses the teeth 22 into the drive pockets 24 locking the floating member in the drive position. From Fig. 5 it can be seen that the clutch will free wheel, the drive roller 36 slipping, until power is applied when it will engage, free wheeling again whenever the driving part 11 etc. are retarded. The clutch is released by giving a momentary rightward motion to the rod, fork and driven member while there is some degree of load on it, upon which the advance of the driving member 11 carries the floating member forward to the release position in a manner already described, as in Figs. 2 and 3, and then the teeth 22 are pressed into the release or drag pockets 23 and lock it there.

The driving member 11 can now advance freely, and if the drive shaft is retarded the drag rollers 38 grip and the engine or motor can act as a brake.

As the floating member is carried from one position to the other the rollers which carry it over are struck off before it completes its arc, the rest of the necessary motion will generally be effected by its momentum. To prevent its halting where the rollers are in contact with the driving member or drum, wedge and striker block at once, which appears apt to set-up a momentary chattering, the fingers 53 and 54 are provided with springs of fair strength and adjusted so that at the instant a roller is struck they tend to pull the wedge clear away from it. Where rough usage has to be withstood the striker block system can be made much more rigid, one simple way being to replace the thin disc 42 by a stout flange on the driven shaft and to secure the striker blocks to it.

On reading the following description of the transmission it should be borne in mind that, when the clutch is operative, the floating member is set in the drive position by momentarily unlocking it when there is a backward drag on the drive shaft, and in the release position by such unlocking at a time when the drive shaft tends to advance, i. e. when the throttle is open.

I will now describe a way in which my clutch may be incorporated in a transmission.

The transmission shown in Fig. 1 may be regarded as a more or less conventional three speed manually operated one in which the reversible roller clutch replaces the direct drive lock and which has a free wheel device in the second gear train. The reversible property of the clutch is used for making the engine act as a brake. For driving the car backward an ordinary reverse gear is used.

When the gears are in neutral, first or reverse the latch 32 holds the direct drive clutch out of action and the machine behaves as an ordinary one, but when the second or free wheel gear is meshed the latch is lifted and the clutch becomes operative. The gear changing between second and third then becomes essentially automatic. The free wheel train can take the drive when the direct drive is released by moving the rod 31 when the throttle is open, and reset in the drive condition by moving the rod when the throttle is closed. The rod is actuated preferably from the engine clutch pedal shown as 80 in Fig. 6, in which the end of the rod 31 is seen projecting from the gear box 81. When the pedal is depressed the spring 82 turns the short lever 83 on its pivot 84 so that its end 85 pushes the rod 31 to the right. Thus the sliding member 20, 21 moves and the floating member is unlocked every time the pedal is operated, and the load is eased at the time by the partial release of the engine clutch so that the sliding member can move easily on its splines. The spring 82 is decidedly stronger than the spring 33.

The countershaft 3 is driven at reduced speed by the gears 13 and 61. For first gear drive the gear 62 sliding with its splined hub 63 meshes with 65. For reverse a reversing gear, which is above the plane of section and in constant mesh with the right hand ends of the teeth 65, slides along to mesh with this gear and 62 at once. The ordinary gear shifting means have been left out for clearness. For the second or free wheel train the sliding hub 63 moves the free wheel gear 70 into mesh with 71. The free wheel device may be of any suitable kind, in the drawing the gear 70 and drum 73 are secured together, bushed at 72, and freely mounted on the hub 63. A roller is indicated at 74 and the wedge member 75 is secured to the gear 62.

When these sliding gears are moved to the left the latch 32 is lifted by any suitable means such as that indicated in Fig. 7. There 88 is a sliding rod used to operate the member 63 etc. and which has a cam 89 to engage a pin 90 on the latch 32 and thus lift it when the parts move to the left to mesh the free wheel gear 70. The fork 30 and sliding member 20 are now free to move and the direct drive clutch becomes operative.

When the manually operated change from first or neutral to second is being made the rod 31 and sliding member 20 are held to the right by the device of Fig. 6 until the pedal 80 is let back. As the engine at the time is generally revolving faster than the driven shaft 2 the floating member (Figs. 2 and 3) will be carried forward to the release position, the teeth 22 will slip into the release or drag pockets 23 and the car will be driven through the second gear train 70, 71 as the pedal 80 is let back.

If the car is accelerated and then the throttle is closed the drag rollers 38 will grip and the engine will drag acting as a brake if so desired. If the pedal 80 is momentarily depressed while there is this drag on the machine the floating member is carried backward to the drive position (Figs. 4 and 5), as has been explained before, and the clutch free wheels until the throttle is opened when it engages and takes the direct drive.

When the pedal 80 is depressed the sliding member 20, 21 may not slide at first but the spring 82 will give until the partial release of the engine clutch eases the load or drag sufficiently to allow it to move on its splines. If the engine were moving faster than the driven shaft as the pedal 80 is let back the floating member would obviously not be carried backward to the drive position and the teeth 22 would merely return to the release of drag pockets 23.

The change up is thus effected by momentarily depressing the pedal while the engine is throttled and dragging, and then opening the throttle. To change down the pedal is momentarily depressed while the throttle is open. The spring 82 gives until the load is eased, the floating member is unlocked and then carried forward to the release position and the teeth 22 slip into drive pockets 24 as the pedal is let back, the engine gains speed and the free wheel second gear takes the drive. It is necessary to have the throttle open to some extent at the time so that the floating member may be carried forward to the release position; if it is closed momentarily depressing the pedal has no effect. If the throttle is closed as soon as the clutch is released the drag rollers 38 see Fig. 3 will grip and the engine will act as a brake. Thus the direct drive can be turned in less than a second from the free wheeling condition to a braking device by a momentary punch of the pedal 80 and a touch of the accelerator, a great convenience to the driver and a means of saving wear on the brakes on long hills. For dangerously steep hills the first gear may be used for braking in the ordinary way.

The real principle of the complete transmission lies in the combination with suitable ordinary gears for low gear and reverse drives and for braking torque, of a high gear clutch of the type described and a free wheel device in a lower gear train. The simple pedal operated gear change may, however, be obtained wherever the last two features are combined, whether or not there are other gears.

Whenever the free wheel gear 70 is moved out of mesh the rod 88 in Fig. 7 moves the cam 89 away from the pin 90 and allows the latch 32 to fall and hold the fork 30. This it can do because the depression of the pedal 80 moves the rod 31 to the right.

The operating means shown in Fig. 6 ensures an easing of the load for allowing the sliding member 20, 21 to slide easily. It should be noted, however, that even if the splined hub 21 were made to slide under full load yet there could be no load on the clutch when the rollers are struck off since the load ceases the instant the teeth 22 move out of pockets 23 or 24.

The latch 32 while not actually essential affords a convenient way of disconnecting the engine when at rest, it facilitates pushing the car about and starting the engine by hand.

The latch holds the clutch out of action as explained above, so that car and engine can move independently. Otherwise, for instance the reversible free-wheel clutch might be locked in the drive condition when it is desired to crank the engine by hand and it would be difficult to disconnect it by pressing engine clutch pedal.

Now that the principles and construction of the clutch and transmission have been explained in some detail I think it can be seen that a number of alterations can be made without departing from the spirit of the invention.

It is clear, I consider, that more than one automatic clutch can be used and that further ordinary gears can be added, and thus the machine adapted for use with heavy vehicles. The parts of the clutch may be variously rearranged with respect to the drive and driven shafts, although the construction shown seems preferable in having the drum, the simplest part of the clutch, the part which is subject to angular vibrations from the engine. While the gears may be arranged in several ways there is some advantage in having the first and second gears 62 and 70 on the same sliding hub 63 so that the change from first to second is a straight pull on the hand lever.

The second is a free wheel gear and as the change can generally be made as the car begins to move it gives no trouble as do ordinary changes at higher speeds. Thus in a car where changes down from second to first are required only rarely it can be said that practically all the troublesome manual gear changing is eliminated, and that in any car by far the greatest part of it can be eliminated.

In the drawings the rollers are shown as cylinders, a form which seems the best for simplicity and strength. Inspection of the drawings show that any form with circular section (cone, sphere etc.) would act in the same way.

As only a very small part of the surface contacts with the drum or wedge the roller need not have a completely circular section, as long as it has two curved surfaces to coact with the drum and wedge and jam between them, it will act in essentially the same manner, though it may roll only by a microscopic amount in engaging and letting go. The term roller is, therefore, not to be taken as limited to cylinders or balls.

What I claim as my invention is:

1. In a free wheel clutch transmission device, the combination with main driving and driven parts, of a floating member to which one of the said main parts is adjacent, these floating and adjacent members having a limited arc of mutual freedom, means for positively locking the floating member at one end of the arc in a drive position and for so locking it at the other end in a drag position, clutch parts between the floating member and the other of said main parts adapted to assume a driving condition in which they can transmit the drive or free wheel, and a drag condition in which they allow free advance of the main driving part or transmit dragging torque if the same is retarded, mechanism controlled by the position of the floating member in the said arc for maintaining the clutching parts in the driving condition when the floating member is in the drive position and in the drag condition when it is in the drag position, means for unlocking the floating member from the drive or drag position to allow the advance or retardation of the main driving part to carry it substantially without effort to the other position.

2. In a free wheel clutch transmission device, the combination with main driving and driven parts, of a floating member to which one of the said main parts is adjacent these floating and adjacent members having a limited arc of mutual freedom, automatic means for positively locking the floating member at one end of the arc in a drive position and for so locking it at the other end in a drag position, clutching parts between the floating member and the other of said main parts adapted to assume a driving condition in which they can transmit the drive or free wheel, and a drag condition in which they allow free advance of the main driving part, or transmit dragging torque if the same is retarded, mechanism controlled by the position of the floating member in the said arc for maintaining the clutching parts in the driving condition when the floating member is in the drive position and in the drag condition when it is in the drag position, means for unlocking the floating member from the drive or drag position to allow the advance or retardation of the main driving part to carry it substantially without effort to the other position.

3. In a free wheel clutch transmission device, the combination with main driving and driven parts, of a floating member to which one of the said main parts is adjacent these floating and adjacent members having a limited arc of mutual freedom, means for positively locking the floating member at one end of the arc in a drive position and for so locking it at the other end in a drag position, clutching parts between the floating member and the other of said main parts adapted to assume a driving condition in which they can transmit the drive or free wheel, and a drag condition in which they allow free advance of the main driving part or transmit dragging torque if the same is retarded, mechanism controlled by the position of the floating member in the said arc for maintaining the clutching parts in the driving condition when the floating member is in the drive position, and in the drag condition when it is in the drag position, means by which the operator can unlock the floating member from the drive or drag position to allow the advance or retardation of the main driving part to carry it substantially without effort to the other position.

4. In a free wheel clutch transmission device, the combination with main driving and driven parts, of a floating member to which one of the said main parts is adjacent, these floating and adjacent members having a limited arc of mutual freedom, means axially sliding on the adjacent member and means on the floating member coacting therewith for automatically locking the floating member at one end of the arc in a drive position and for so locking it at the other end in a drag position, clutching parts between the floating member and the other of said main parts adapted to assume a driving condition in which they can transmit the drive or free wheel, and a drag condition in which they allow free advance of the main driving part or transmit dragging torque if the same is retarded, mechanism controlled by the position of the floating member in the said arc for maintaining the clutching parts in the driving condition when the floating member is in the driving position and in the drag condition when it is in the drag position, means by which the operator can move the sliding means to unlock the floating member from the drive or drag position to allow the advance or retardation of the main driving part to carry it substantially without effort to the other position.

5. In a free wheel roller clutch transmission device, the combination with main driving and driven parts, of a floating member to which one of the said main parts is adjacent, these floating and adjacent members having a limited arc of mutual freedom, means for positively locking the floating member at one end of the arc in a drive position and for so locking it at the other end in a drag position, wedging faces on the floating member, a drum on the other of said main parts and coacting rollers adapted to assume a driving condition in which they can transmit the drive or free wheel and a drag condition in which they allow free advance of the main driving part or transmit dragging torque if the same is retarded, mechanism controlled by the position of the floating member in the said arc for maintaining the rollers in the driving condition when the floating member is in the drive position and in the drag condition when the floating member is in the drag position, means for unlocking the floating member from the drive or drag position to allow the advance or retardation of the main driving part to carry it substantially without effort to the other position.

6. In a free wheel roller clutch transmission device, the combination with main driving and driven parts, of a floating member to which one of the said main parts is adjacent, these floating and adjacent members having a limited arc of mutual freedom, locking parts axially sliding on adjacent member and coacting locking parts on the floating member adapted to lock the floating member automatically at one end of the arc in a drive position and for so locking it at the other end in a drag position, wedging faces on the floating member, a drum on other of said main parts and coacting rollers adapted to assume a driving condition in which they can transmit the drive or free wheel and a drag condition in which they allow free advance of the main driving part or transmit dragging torque if the same is retarded, mechanism controlled by the position of the floating member in the said arc for maintaining the rollers in the driving condition when the floating member is in the drive position and in the drag condition when the floating member is in the drag position, means by which the operator can move the sliding parts to unlock the floating member from the drive or drag position to allow the advance or retardation of the main driving part to carry it substantially without effort to the other position.

7. In a reversible free-wheel clutch device, the combination with two main parts and a floating torque member having an arc of limited rotation with respect to an adjacent main part between a first and a second position, of a locking device adapted to lock the floating member alternately in either of the said positions, reversible free-wheel clutch parts between the floating member and the other main part adapted to assume alternately a first condition to transmit torque only in a first direction and a second condition to transmit it only in a second direction, mechanism controlled by motion of the floating member across the said arc adapted to set the clutch parts in the first condition as it moves to the first position and in the second condition as it moves to the second position, and means for actuating the locking device to unlock the floating member from either of the said positions to allow relative motion of the two main parts to carry it freely to the other position.

GIBBS BLACKSTOCK.